350-164 SR
6/20/78 XR 4,095,889

United States Patent [19]

Goren

[11] 4,095,889

[45] Jun. 20, 1978

[54] EXPOSURE SYSTEM FOR AN ELECTROPHOTOGRAPHIC PRINTING MACHINE

[75] Inventor: Robert N. Goren, Rochester, N.Y.

[73] Assignee: Xerox Corporation, Stamford, Conn.

[21] Appl. No.: 651,315

[22] Filed: Jan. 22, 1976

[51] Int. Cl.² .................... G03G 15/01; G03B 27/76

[52] U.S. Cl. .................................... 355/4; 350/164; 350/188; 354/270; 355/71

[58] Field of Search .................... 355/71, 69, 3 R, 4; 96/45, 116; 350/164, 188; 354/270

[56] References Cited

U.S. PATENT DOCUMENTS

| | | | |
|---|---|---|---|
| 1,368,608 | 2/1921 | Curran | 354/270 |
| 2,478,443 | 8/1949 | Yule et al. | 96/116 X |
| 3,961,848 | 6/1976 | Turner | 355/11 X |
| 3,967,894 | 7/1976 | Tsilibes | 355/71 X |

*Primary Examiner*—Fred L. Braun
*Attorney, Agent, or Firm*—J. J. Ralabate; C. A. Green; H. Fleischer

[57] ABSTRACT

An optical system in which a modulated light image of an original document is projected onto a receiving member. The optical system includes a lens and an opaque member having an array of apertures therein associated therewith to improve the light transmission properties thereof.

8 Claims, 5 Drawing Figures

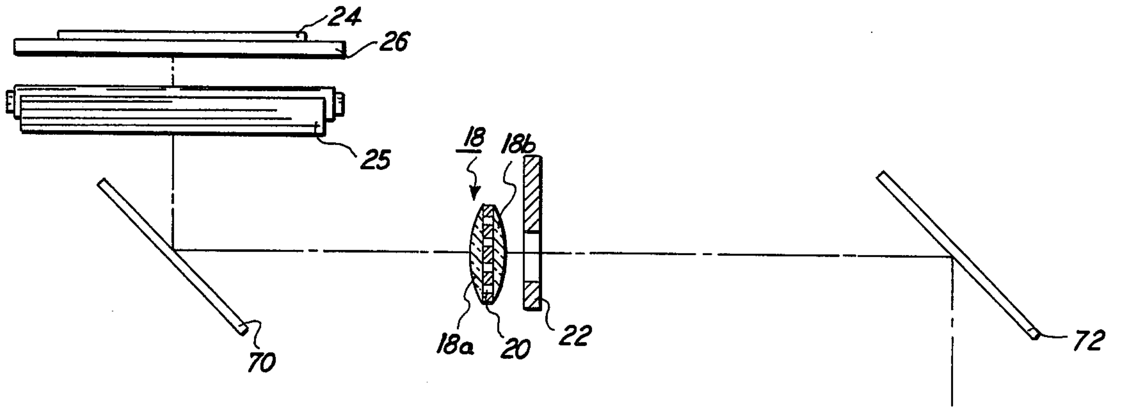
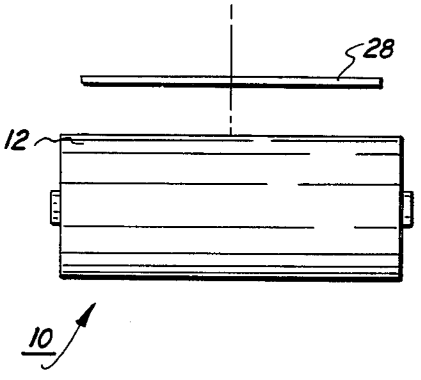
FIG. 2
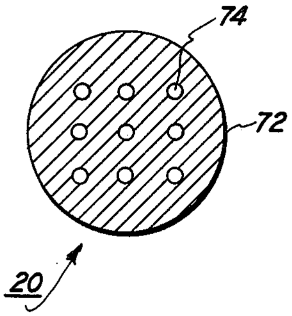
FIG. 3a
FIG. 3b
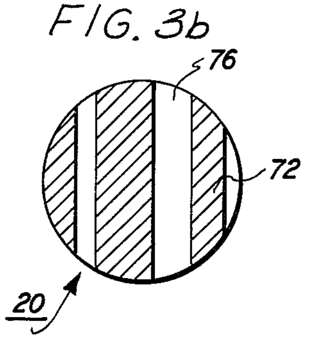
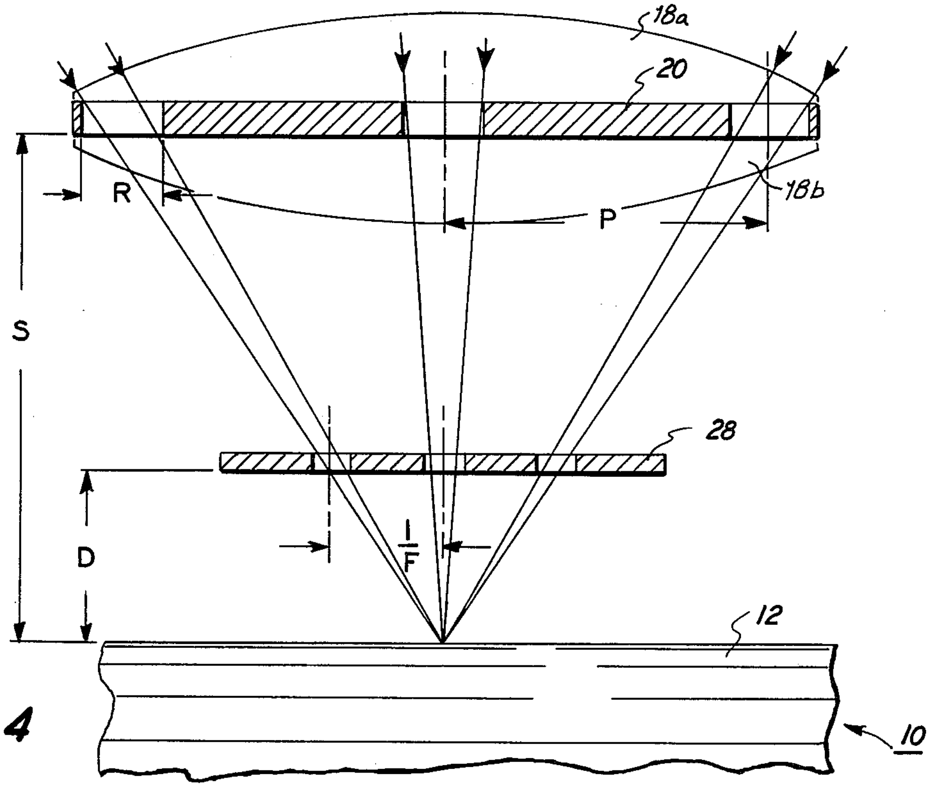
FIG. 4

EXPOSURE SYSTEM FOR AN ELECTROPHOTOGRAPHIC PRINTING MACHINE

BACKGROUND OF THE INVENTION

This invention relates generally to an electrophotographic printing machine, and more particularly concerns an optical system having an opaque member with an array of apertures therein associated with a lens to improve the light transmission thereof.

A typical electrophotographic printing machine exposes a charged photoconductive member to a light image of an original document. The irradiated areas of the photoconductive member are discharged selectively recording thereon an electrostatic latent image corresponding to the original document being reproduced. A development system moves a developer mix of carrier granules and toner particles into contact with the latent image recorded on the photoconductive member. The toner particles are attracted electrostatically from the carrier granules to the latent image. In this manner, a powder image is formed on the photoconductive member. Thereafter, the powder image is transferred to a sheet of support material. After transfer, the sheet of support material passes through a fusing device which permanently affixes the toner powder image thereto.

In multi-color electrophotographic printing, the foregoing process is repeated a plurality of cycles for each discrete color contained within the original document. Hence, multi-color printing requires the light image to be filtered to record an electrostatic latent image on the photoconductive member corresponding to a single color of the original document. This single color electrostatic latent image is developed with toner particles of a color complementary to the color of the filtered light image. Thereafter, the toner powder image is transferred to a sheet of support material. This process is repeated for successively differently colored light images. Each toner powder image is transferred, in superimposed registration with the prior toner powder image, onto the sheet of support material. In this manner, a multi-layered toner powder image is formed on the sheet of support material containing therein the colors of the original document. This multi-layered toner powder image is then affixed permanently to the sheet of support material forming a permanent color copy of the original document.

In most electrophotographic printing machines, tone graduations are difficult to form. This problem may be obviated by the utilization of a screening technique. Generally, screening methods produce the effect of tone graduations by variations of the diameter of the half-tone dots or the width of the half-tone lines comprising the toner powder image created by the screen. In the highlighted zones or regions of high intensity of illumination, the dots or lines are small, increasing in size through the intermediate shades until they merge together in the shadow regions. At the highlight end of the tone scale, there will be complete whiteness while at the shadow end, nearly solid blackness. The foregoing is described more fully in U.S. Pat. No. 2,598,732 issued to Walkup in 1952. Other patents exemplifying various screening techniques are U.S. Pat. No. 3,535,036 issued to Starkweather in 1970; U.S. Pat. No. 3,121,010 issued to Johnson et al. in 1964; U.S. Pat. No. 3,493,381 issued to Maurer in 1970; U.S. Pat. No. 3,776,633 issued to Frosch in 1973; and U.S. Pat. No. 3,809,555 issued to Marley in 1974.

It is well known, with the screen interposed between the lens and photoconductive surface, that the lens aperture size must often be restricted to obtain the desired aerial image modulation behind the screen. This is due to the light shadow-refraction pattern behind the screen being determined by the solid angle of the light rays incident on the screen. Optimization of the lens to achieve the desired aerial image modulation often reduces the overall light intensity transmitted by the lens relative to that which may be transmitted when a clear aperture is employed. This results in a more intense light source being required to obtain the same exposure level. This problem is especially acute when "phase" screens are employed. In a typical phase screen system having a 1:1 magnification, this may require an effective F-stop of about 50 compared with the typical F-stop of about 5.6 to 4.5 presently employed in electrophotographic printing machines. Contrawise, a typical ruled screen may require an F-stop of anywhere from 6.3 to 11. Thus, it is evident that there is significant light loss in either of the foregoing cases.

Multi-aperture stops have been employed in photography. For example, A. Freuwirth in American Photoengraver, 28, 275 (1936) discloses work performed in 1894. As described therein, a lens stop could be designated with two, four, or more apertures suitably distributed over a lens for use with half-tone photography. Additionally, U.S. Pat. Nos. 2,703,281 and 2,920,547 issued to Consaul et al. disclose a lens aperture plate having an array of openings therein. The openings relate in size to the optimum F-stop and in geometry to the half-tone screen. Various other prior art references teach similar types of processes, exemplary of these are U.S. Pat. Nos. 1,460,744 issued to Boysen; 2,145,427 issued to Morris, Jr.; 2,478,443 issued to Yule et al.; 2,959,105 issued to Kazuo Sayanagi; and 3,340,061 issued to McCarthy.

It is a primary object of the present invention to improve electrophotographic printing by employing an aperture array associated with a lens for use in a half-tone imaging system in electrophotographic printing wherein the light intensity transmitted to the photoconductive member is optimized.

SUMMARY OF THE INVENTION

Briefly stated, and in accordance with the present invention, there is provided an optical system for projecting a modulated light image of an original document onto a receiving member.

Pursuant to the features of the present invention, means are provided for illuminating the original document. The light rays transmitted from the original document pass through a lens which forms a light image thereof corresponding to the original document. A screen member, positioned in the optical light path and spaced from the receiving member, modulates the light image transmitted therethrough. The lens has an opaque member operatively associated therewith. A plurality of equally spaced transparent regions are located in the opaque member.

BRIEF DESCRIPTION OF THE DRAWINGS

Other objects and advantages of the present invention will become apparent upon reading the following detailed description and upon reference to the drawings, in which:

FIG. 2 is an elevational view of the optical system employed in the FIG. 1 printing machine;

FIG. 3 (*a*) is an elevational view of one embodiment of the opaque member associated with the lens of the FIG. 2 optical system;

FIG. 3 (*b*) is an elevational view of another embodiment of the opaque member associated with the lens of the FIG. 2 optical system; and FIG. 4 is an elevational view illustrating the geometrical relationship in the FIG. 2 optical system.

Figure 1:
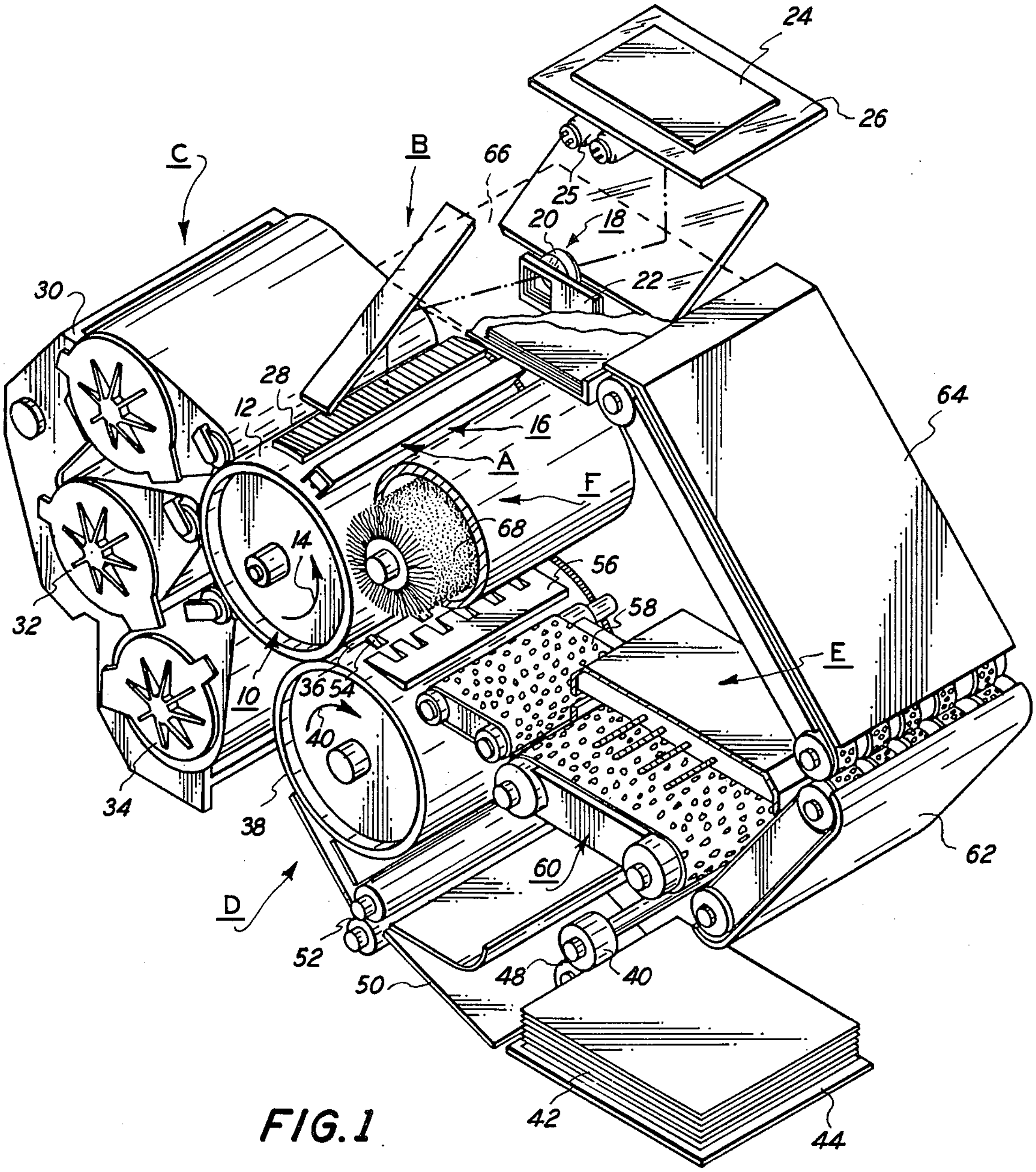
FIG. 1 is a schematic perspective view of an electrophotographic printing machine incorporating the features of the present invention therein.

While the present invention will be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

For a general understanding of an electrophotographic printing machine incorporating the features of the present invention therein, reference is had to FIG. 1. Throughout the drawings, like reference numerals have been used to designate identical elements. FIG. 1 depicts a multi-color electrophotographic printing machine producing colored copies from a colored original document which may be in the form of single sheets, books or other three-dimensional objects.

As shown in FIG. 1, the electrophotographic printing machine includes a photoconductive member or receiving member having a rotatable drum 10 with a photoconductive surface 12 entrained about and secured thereto. Photoconductive surface 12 is made preferably from a polychromatic selenium alloy of a type described in U.S. Pat. No. 3,655,377 issued to Sechak in 1972. A timing disc (not shown) is mounted at one end of the shaft of drum 10 and rotates in synchronism therewith to activate sequentially the various processing stations.

For purposes of the present application, each processing station operating in the electrophotographic printing machine will be described briefly hereinafter.

As drum 10 rotates in the direction of arrow 14, it passes through charging station A. Charging station A has positioned thereat a corona generating device, indicated generally by the reference numeral 16, which charges a portion of photoconductive surface 12 to a relatively high substantially uniform level. A suitable corona generating device is described in U.S. Pat. No. 3,875,407 issued to Hayne in 1975. After photoconductive surface 12 is charged to a substantially uniform level, drum 10 rotates the charged portion thereof to exposure station B.

At exposure station B, the charged area of photoconductive surface 12 is exposed to a colored filter light image of the original document. Lens 18, opaque member 20, and filter mechanism 22, are located at exposure station B and move in synchronism with the rotation of drum 10. A suitable drive mechanism is described in U.S. Pat. No. 3,062,108 issued to Mayo in 1952. Opaque member 20 includes a plurality of transparent regions or apertures therein to transmit the light rays through filter 22. The detailed structural configuration of opaque member 20 will be discussed hereinafter with reference to FIGS. 3*a* and 3*b*. U.S. Pat. No. 3,775,006 issued to Hartman et al. in 1973 discloses a color filter mechanism suitable for use in the FIG. 1 electrophotographic printing machine. Preferably, lens 18 is a six-element split dagor lens assembly having three elements in the front component and three elements in the back component with opaque member 20 interposed therebetween. U.S. Pat. No. 3,592,531 issued to McCrobie in 1971 describes a lens of this type adapted for use in a multi-color electrophotographic printing machine. Original document 24 is positioned upon transparent viewing platen 26 face down. Lamp assembly 25, located beneath transparent viewing platen 26, illuminates the informational areas of original document 24. In this manner, a flowing light image of original document 24 is created and projected through screen member 28 onto the charged portion of photoconductive surface 12. Irradiation of the charged portion of photoconductive surface 12 results in the selective discharge thereof and the recording of an electrostatic latent image corresponding to a single color of the informational areas contained in original document 24. During exposure, filter mechanism 22 interposes selected color filters into the optical light path. Successive color filters operate on the light rays passing through lens 18 and opaque member 20 to create a single color light image which is modulated by screen 28. This records a single color electrostatic latent image on photoconductive surface 12. The detailed structural characteristics of the optical system employed in exposure station B will be described hereinafter, in greater detail, with reference to FIGS. 2 through 4, inclusive.

After the modulated single color electrostatic latent image is recorded on photoconductive surface 12, drum 10 rotates the latent image to development station C. Development station C includes three developer units, generally designated by the reference numerals 30, 32, and 34, respectively. A suitable development station employing a plurality of developer units (in this case three) is described in U.S. Pat. No. 3,854,449 issued to Davidson in 1974. Each of the foregoing developer units is of a magnetic brush type. A typical magnetic brush developer unit employs a magnetizable developer mix comprising carrier granules and toner particles. In this way, a directional flux field is formed which continually creates a brush of developer mix. This brush is brought into contact with the latent image recorded on photoconductive surface 12. The toner particles adhering electrostatically to the carrier granules of the developer mix are attracted by the greater electrostatic force of the latent image to render it visible. Developer units 30, 32, and 34, respectively, contain differently colored toner particles. Each of the toner particles contained in the corresponding developer unit relates to the complement of the color of the light image transmitted through filter 20. Hence, a latent image formed from a green filtered light image is developed with green absorbing magenta particles. Similarly, latent images formed from blue and red light images are developed with yellow and cyan toner particles, respectively.

After the latent image recorded on a photoconductive surface 12 is developed, drum 10 rotates the toner powder image to transfer station D. At transfer station D, the toner powder image adhering electrostatically to photoconductive surface 12 is transferred to a sheet of support material 36 secured releasably on transfer roll 38. Transfer roll 38 rotates in the direction of arrow 40 to recirculate sheet 36 in synchronism with the angular rotation of drum 10, as indicated by arrow 14. A suitable electrically biased transfer roll having a sheet of support material secured thereto is described in U.S. Pat. No. 3,612,677 issued to Langdon et al. in 1971. As described therein, transfer roll 38 is electrically biased to a potential of sufficient magnitude and polarity to electrostatically attract toner particles from photoconductive surface 12 to sheet 36. Inasmuch as transfer roll 38 rotates in synchronism with drum 10, successive toner powder images may be transferred from photoconductive surface 12 to sheet 36, in superimposed registration with one another.

Prior to proceeding with the remaining processing stations disposed about the periphery of drum 10, the sheet feeding apparatus will be briefly described. With continued reference to FIG. 1, sheet 36 is advanced from stack 42 disposed upon tray 44. Feed roll 46, in operative communication with retard roll 48, separates and advances the upper-most sheet from stack 42. The advancing sheet moves into chute 50 and is directed thereby into the nip between register rolls 52. Register rolls 52 align and forward the advancing sheet, in synchronism with the movement of transfer roll 38. In this way, gripper fingers 54, disposed on transfer roll 38, receive sheet 36 and secure it thereto. Gripper fingers 54 secure releasably support material 36 to transfer roll 38 for movement in a recirculating path therewith. Successive toner powder images are transferred to support material 36 in superimposed registration with one another forming a multi-layered toner powder image thereon. After transferring each of the toner powder images (in this case three) to support material 38, gripper fingers 54 space support material 36 from transfer roll 38. Stripper bar 56 is then interposed therebetween to separate support material 36 from transfer roll 38. Thereafter, endless belt conveyor 58 moves support material 36 to fixing station E.

Fixing station E includes a fusing apparatus indicated generally by the reference numeral 60. Fuser 60 provides sufficient heat to permanently affix the multilayered toner powder image to sheet 36. One type of suitable fuser is described in U.S. Pat. No. 3,826,898 issued to Draugelis et al. in 1974. After the fusing process, sheet 36 is advanced by endless belt conveyors 62 and 64 to catch tray 66 for subsequent removal therefrom by the printing machine operator.

Invariably, after transferring the requisite number of toner powder images to support material 36, some residual toner particles adhere to photoconductive surface 12. Cleaning station F, the final processing station in the direction of rotation of drum 10, as indicated by arrow 14, removes these residual toner particles. A pre-clean corona generating device (not shown) neutralizes the charge on photoconductive surface 12 and that of the residual toner particles. This enables fibrous brush 68, in contact with photoconductive surface 12, to remove the residual toner particles therefrom. A suitable brush cleaning device is described in U.S. Pat. No. 3,590,413 issued to Gerbasi in 1971.

It is believed that the foregoing description is sufficient for purposes of the present application to describe a multi-colored electrophotographic printing machine incorporating the features of the present invention therein.

Referring now to FIG. 2, exposure station B will be described hereinafter in greater detail. As shown therein, lamps 25 move across platen 26, illuminating original document 24 disposed thereon face down. Lens 18, opaque member 20, and filter 22 move in synchronism therewith. The light rays reflected from original document 24 are transmitted through platen 26 onto mirror 70. Mirror 70 reflects the light rays through lens 18, the apertures of opaque member 20, filter 22, and onto mirror 72. Mirror 72 reflects the light image through screen 28 onto the charged portion of photoconductive surface 12. Preferably, opaque member 20 is a flat sheet of opaque material having a plurality of equally spaced apertures or holes therein. Opaque member 20 is interposed between the front component 18*a* and back component 18*b* of lens 18. The size of the apertures in opaque member 20 may be equal to one another or variable to adjust the intensity pattern. Turning now to FIG. 3*a*, the detailed structure of one embodiment of opaque member 20 will be discussed.

As shown in FIG. 3*a*, opaque member 20 includes an opaque sheet 72, preferably the same size as lens 18. The embodiment shown in FIG. 3*a* is adapted for use with a cross-line screen or grid screen pattern rather than a straight or ruled screen pattern. As shown in FIG. 3*a*, opaque sheet 72 has a plurality of equally spaced apertures or holes 74. All of holes 74 in sheet 72 are substantially the same size. However, the size of the holes with respect to one another may be variable to adjust the intensity pattern. An alternative embodiment for use with a straight line screen is shown in FIG. 3*b*. As depicted thereat, opaque member 20 once again is made from an opaque sheet 72 having a plurality of substantially equally spaced slits 76 therein. Each slit 76 is substantially the same width or may be variable. It should be noted that the apertures depicted in the FIG. 3*a* embodiment are not necessarily round, and one skilled in the art will appreciate that they may be of any configuration so long as they are equally spaced. Thus, square, diamond shaped, or diagonal apertures may also be used in lieu of the round holes depicted in FIG. 3*a*.

Turning now to FIG. 4, the geometric relationship between screen 28, opaque member 20 and photoconductive surface 12 is illustrated. As shown in FIG. 4, the spacing between the screen 28 and photoconductive surface 12 is given the following relationship:

$$D = S/PF$$

where $P$ is the center to center distance between adjacent apertures, $S$ is the distance between opaque member 20 and photoconductive surface 12, and $F$ is the half-tone screen line frequency, i.e., number of lines per linear inch.

When the relationships of the foregoing equation are maintained, the light rays transmitted through each of the apertures 74 or slits 76 in opaque member 20 will be coincident with one another on the image plane, i.e., photoconductive surface 12. Thus, the intensity patterns produced by each of the apertures are in coincidence with one another. The center to center distance between adjacent apertures and the opaque member is chosen such that the intensity patterns produced by adjacent apertures at a given distance behind the screen due to each of the holes, exactly overlaps. Hence, the intensity pattern at this distance behind the screen is identical for one hole or a multiplicity of holes except for a scaling factor. This overlap is produced by the light rays passing through one lens apertures and a given screen hole falling on top of the light rays produced by a neighboring lens aperture projected through a neighboring screen hole. The effective F-stop of the lens apertures in this array is given by the following equation:

$$F = S/R$$

where $R$ is the size of each aperture. Typically, $R$ is equal to one half $P$; i.e., the size of each aperture is equal to one half the center to center distance. This is not a required relationship but R must be equal to or less than P. Such an arrangement enables the power of a big lens to be used more effectively and the exposure requirement reduced by the number of holes. For example, with either a cross line ruled screen or phase screen under normal operating conditions, (producing a conventional half tone pattern at the screen frequency) the screen spacing and F-stop of the lens (or of each aperture in an array) should be chosen so that the projection of a lens aperture onto the screen approximately fills the single hole in the screen as is shown in FIG. 4. For conventional screens with ruling widths equal to the spacing between rulings, such a condition automatically implies a spacing within the array such that 25% of the lens stop is occupied by holes. This means that any lens of a diameter much larger than the holes could have a throughput ¼ (2 stops) smaller than the lens opening without a stop, no matter how small the holes are chosen to be. As a practical matter, for use with conventional ruled crossline screens, approximately 4 × 4 or 16 apertures could be fitted into an F/4 lens producing a light modulation pattern identical to that of an F/16 lens with a light throughput equal to that of an F/8 lens. In the case of a crossline phase screen, about 12 × 12 or 144 apertures could be fitted into an F/4 lens producing a light throughout again equal to that of an F/8 lens but with a light modulation pattern identical to that of a single F/48 lens. The resultant improvement in light transmitting capability in these cases over a single F/16 or F/48 lens would be factors of 4 and 36 times, respectively.

In recapitulation, it is apparent that the aperture array of the present invention improves the light transmission of the lens without disturbing the half-tone imaging produced by the associated screen. This is achieved by employing an opaque member having a plurality of apertures therein positioned closely adjacent to a lens. The geometric relationship between the screen and opaque member is precisely determined. This insures that successive light rays transmitted therethrough overlap one another on the photoconductive surface. The foregoing is readily employable in an electrophotographic printing machine adapted to reproduce multicolored copies. However, it is also readily usable in a conventional black and white printing machine. A system of this type substantially improves the exposure values and optimizes the half tone images produced thereby.

It is, therefore, apparent that there has been provided in accordance with the present invention, an exposure system for an electrophotographic printing machine that fully satisfies the objects, aims, and advantages hereinbefore set forth. While the present invention has been described in conjunction with the preferred embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An electrophotographic printing machine of the type having an electrostatic latent image of an original document recorded on a photoconductive member, wherein the improvement includes:

means for illuminating the original document;

a lens for creating a light image of the original document from the light rays transmitted thereto;

a screen member positioned in the optical light path and spaced from the photoconductive member for modulating the light rays transmitted therethrough; and an opaque member operatively associated with said lens and having a plurality of equally spaced transparent regions therein with the distance between said screen member and photoconductive member being proportional to the distance between said opaque member and photoconductive member, said screen member being spaced from the photoconductive member a distance such that the light rays transmitted through different transparent regions of said opaque member and passing through said screen member are in coincidence with one another on the photoconductive member.

2. A printing machine as recited in claim 1, wherein said screen member is a transparent sheet member having a plurality of equally spaced opaque lines thereon.

3. A printing machine as recited in claim 2, wherein said screen member is spaced from the photoconductive member a distance equal to the distance said opaque member is spaced from the photoconductive member divided by the distance from the centers of adjacent transparent regions of said opaque member multiplied by the reciprocal of the number of opaque lines on said sheet member of said screen member.

4. A printing machine as recited in claim 3, wherein each transparent region of said opaque member is an aperture in said opaque member.

5. A printing machine as recited in claim 3, wherein said transparent regions of said opaque member are of an equal size to one another.

6. A printing machine as recited in claim 3, further including means for filtering the light image transmitted through said screen member onto the photoconductive member recording a single color electrostatic latent image thereon.

7. A printing machine as recited in claim 6, further including means for charging the photoconductive member to a substantially uniform level so as to sensitize the surface thereof.

8. A printing machine as recited in claim 7, further including:

means for developing the single color electrostatic latent image with colored toner particles;

means for transferring the toner particles from the photoconductive member to a sheet of support material; and means for affixing the toner particles to the sheet of support material.

* * * * *